United States Patent [19]

Johnson

[11] 4,456,177
[45] Jun. 26, 1984

[54] SELF-RETURN MECHANISM FOR CAR WASH HOSE BOOM SWIVEL ASSEMBLY

[76] Inventor: Archie L. Johnson, 5201 N. 31st Pl., Phoenix, Ariz. 85016

[21] Appl. No.: 428,313

[22] Filed: Sep. 29, 1982

[51] Int. Cl.³ ............................................. B05B 15/06
[52] U.S. Cl. .................................... 239/209; 239/282; 74/567
[58] Field of Search ...................... 74/567, 569, 568 R; 285/190, 64; 137/615; 134/172, 65, 123, 198; 15/DIG. 2; 239/209, 282

[56] References Cited

U.S. PATENT DOCUMENTS

| | | | |
|---|---|---|---|
| 1,167,479 | 1/1916 | Collison | 285/190 X |
| 1,393,987 | 10/1921 | Wampler | 285/190 X |
| 2,082,654 | 2/1936 | Reader | 285/190 |
| 4,131,132 | 12/1978 | Zierden | 134/123 X |

Primary Examiner—John J. Love
Assistant Examiner—Kevin P. Weldon
Attorney, Agent, or Firm—Cahill, Sutton & Thomas

[57] ABSTRACT

A self-return mechanism for a car wash hose boom swivel assembly includes a cam and a cam follower assembly which counteracts a force caused by the drooping of a flexible hose that extends from an end of a hose boom arm to a spray wand positioned in a wand holder that is attached to a side wall of a car wash bay near an open end thereof. The self-return mechanism returns the hose boom arm to a position such that the drooping portion of the hose is held out of the path of a vehicle as it moves into the bay. If the hose boom arm is within a predetermined 90° arc, the cam follower mechanism produces a self-returning force on the hose boom swivel assembly, but if the hose boom arm is outside of the 90° arc, the swivel assembly rotates without being subjected to any such self-returning force.

14 Claims, 7 Drawing Figures

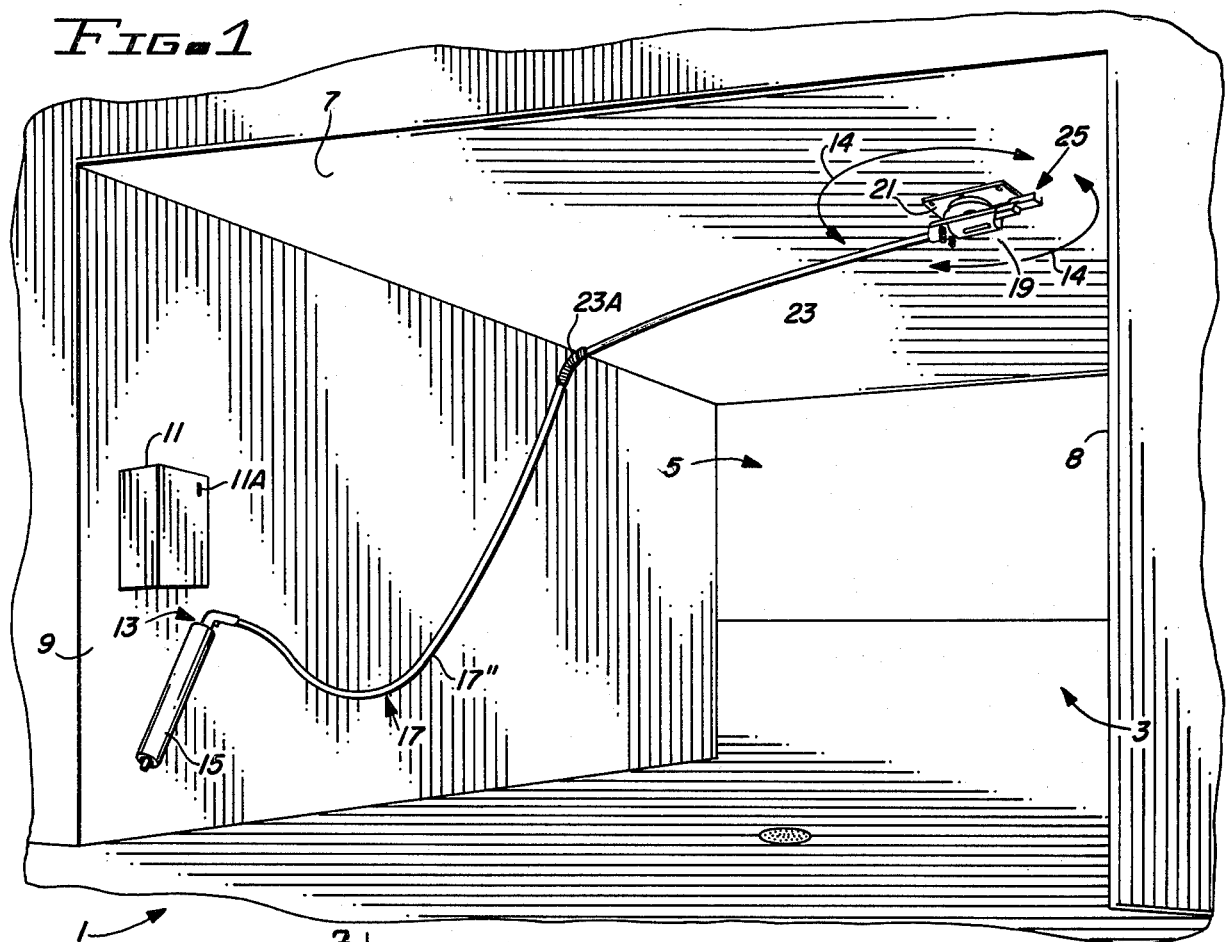
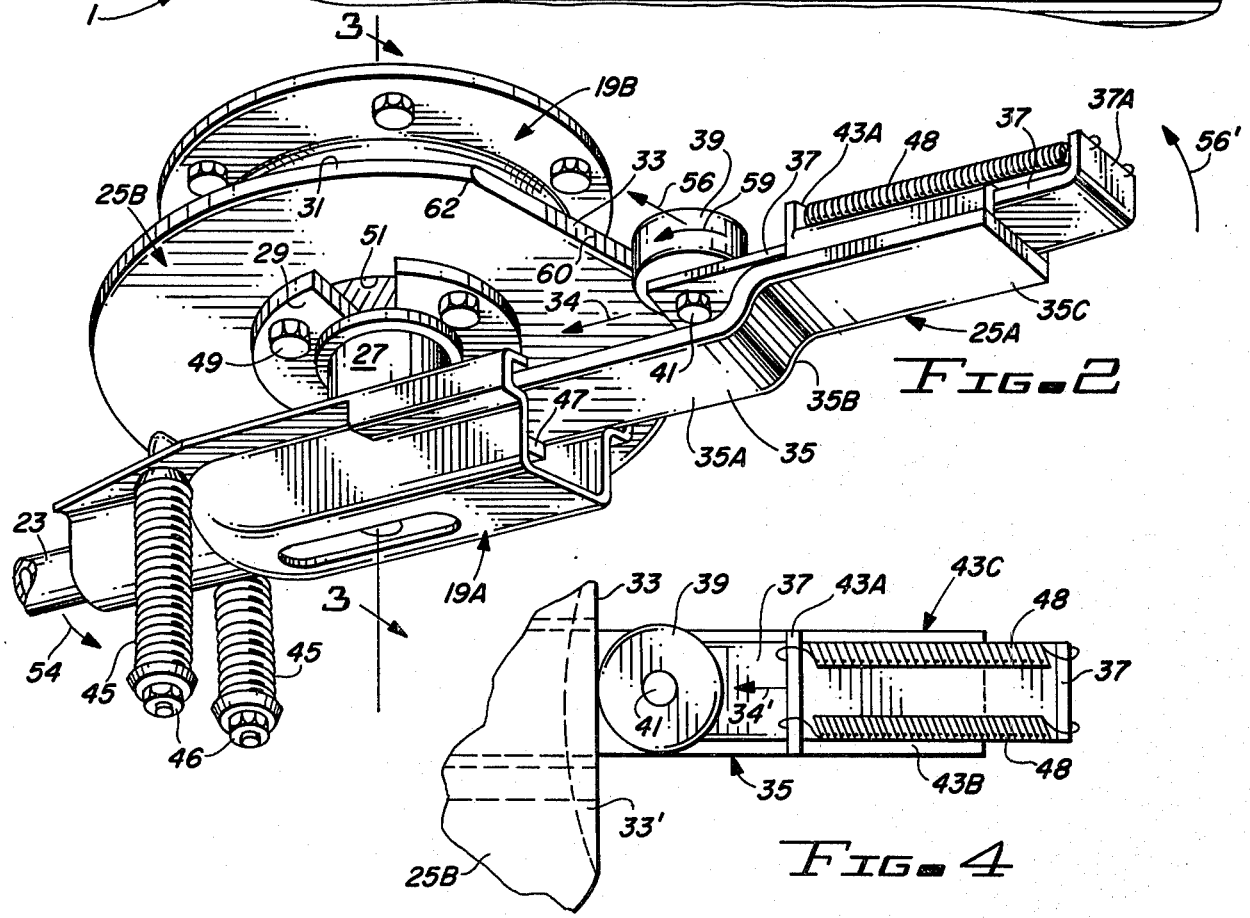

SELF-RETURN MECHANISM FOR CAR WASH HOSE BOOM SWIVEL ASSEMBLY

BACKGROUND OF THE INVENTION

The invention relates to hose boom swivel assemblies mounted on the ceilings of self-service car wash bays wherein a customer inserts a coin in a coin machine that automatically turns on high pressure water and a detergent disposing system, and wherein the customer aims the resulting high velocity stream of liquid from the nozzle of a spray wand at the surface of a vehicle, the hose boom swiveling through a 360° arc as the customer carries the spray wand, which is fed by a flexible feed hose connected to such a hose boom swivel assembly around all sides of the automobile; the invention more particularly relates to a self-return mechanism which prevents the flexible hose extending between the end of hose boom arm and the handle of the wand from drooping in the travel path of an automobile entering the bay.

Self-service car wash establishments are very common. They are often used by persons who have high-profile vehicles, such as campers, motor homes, and the like which cannot pass through many automatic car wash systems. They are also very popular with persons who do not wish to pay the higher cost of having their automobile washed in a car wash facility of the kind that provides automatic washing, waxing, and drying functions, and who are willing to expend some effort themselves to wash their vehicles in order to save money. The self-service car wash facilities being referred to generally include large rectangular bays which are open at least one end, so that an automobile or vehicle can drive into the bay. Such self-service car wash facilities usually have a "coin-box" in which the user must insert a predetermined amount of money in order to activate the system. Typically, such self-service car wash systems have a spray wand having a pistol grip and a long nozzle from which a high-velocity liquid spray is ejected. The spray wand is fed by a long flexible hose supported by a roughly horizontal pivotal hose boom arm that swivels about a vertical axis as the user makes his way around the car, aiming the high velocity stream of detergent and/or water emitted by the nozzle at the surfaces of the vehicle, wetting and soaping such surfaces. The high velocity stream tends to "blast" off dirt and the like. The feed hose preferably does not rub along any surface of the car as the user moves. One relatively inexpensive system of the type described uses a hose boom that is pivotally mounted in the upper center portion of one of the side walls of the bay. This system includes a spring which causes the hose boom to return to a position that is parallel to the wall, so that the feed hose droops from the end of the hose boom and extends to a wand holder in which the wand is placed when not in use. In this system, the feed hose is completely out of the path of any car as it is driven into the bay, and therefore, causes no difficulties due to snagging of the feed hose on parts of the car. However, this system suffers from the shortcoming that the end of the hose boom is in a very inconvenient position for much of the washing operation, since it simply swings through a semicircle over the top of the vehicle. As the user works his way around the car with the spray wand, the hose inevitably rubs across the surface of the car's roof, sometimes leaving dark marks, especially on vinyl "landau tops". The user has to concentrate an undue amount of effort just in controlling the hose and the hose boom, in addition to controlling the direction of the stream of liquid ejected from the nozzle. This can be quite distracting to the user, especially since the self-service car wash systems of this general kind have rather short wash and rinse cycles, and it may be necessary for the user to insert additional coins and go through the entire wash and rinse cycle a second time if the user's progress is slowed simply because he has to struggle with the hose and hose boom.

One of the most common and reliable hose boom mechanisms available is sold by The Zierden Company of Oak Creek, Wisconsin. This device sold under the trade name "ZIERCO WATER BOY", includes a "car wash safety boom and swivel assembly" that is mounted in the center of the ceiling of the car wash bay. Its horizontal hose boom arm is approximately five feet long and pivots freely through an entire 360° circular arc about a vertical axis. This system is very popular in the industry and has much to recommend it, but it does not have a means for causing the hose boom arm to return to a particular direction. The hose boom arm therefore returns to the direction to which it is pulled by the drooping feed hose when the wand is placed on a wand holder, which is a holster-like wand holder that is attached to one of the sidewalls of the car wash bay.

At this point, it is important to realize that it is essential that the wand holder be located very close to the coin box in such systems. It is essential that the user be able to put his handle on the handle of the spray wand before he inserts the coin in the coin box, because typically as soon as the coin is inserted in the coin box, very high pressure is produced in the feed hose, causing a high pressure jet to immediately be ejected from the end of the nozzle. If the wand holder does not have a lock, as some do not, or if the lock is not properly engaged, the high pressure jet can cause the spray wand to shoot out of the holder and begin flying around unless the user grips the handle of the spray wand. This, of course, can cause severe injury to the user as he trys to retrieve the wand and can also cause considerable damage to the automobile.

Next, it must be appreciated that the coin-box usually must be located very close to the entry of the bay, rather than near the center of one of the sidewalls thereof, because the coin box must be kept as dry as possible. Obviously, "over-spray" from the nozzle of the wand as the user sprays his vehicle could soon result in both mechanical and/or electrical malfunctioning if the coin box (which usually houses control elements) is repeatedly subjected to high pressure spraying of water and detergent.

Now, it can be appreciated that when a user of a self-service car wash system in which the above-mentioned ZIERCO hose boom swivel assembly is utilized places the wand in the wand holder (which is mounted on the wall beneath the coin box adjacent to the opening entry of the bay), the freely swivelable hose boom and the feed hose drooping from the free end thereof will point in a direction from the center of the car wash bay to one corner thereof. The feed hose will droop from the free end of the elevated hose boom arm so that it is likely to snag the bumper, mirrors, and/or radio antenna of a car as it pulls into the bay. This has resulted in quite a number of accidents, involving damage to vehicles, injury to customers, and damage to feed hoses and hose boom swivel assemblies. Occasionally, a customer will back out of the bay, either immediately after snagging the hose or after washing the car; in this event, the drooping hose is likely to be snagged by the bumper. If this happens, it usually damages the hose. It also can produce excessive forces on the hose boom assembly, causing damage to it, and furthermore it can cause the spray wand to fly out of the wand holder, possibly damaging the vehicle, and also possibly causing severe injury to the driver of the vehicle, especially if his head is extended out of the vehicle's window to enable him to see what is happening to the snagged feed hose. Damage to the hose boom assembly, spray wand, wand holder, vehicle and driver can also occur if the mirror rather than the bumper of the vehicle snags the feed hose, especially if the mirror happens to be one of the large mirrors that are frequently provided on trucks, motor homes, and tow vehicles. Again, there is a history in the self-service car wash industry of damage to vehicles, car wash apparatus, and persons due to snagging of drooping feed hoses by such mirror structures.

The above described problems are so common that the feed hose in an average car wash bay needs to be replaced approximately every sixty days, at a cost of roughly $45.00.

The "over-hung" weight produced by the drooping feed hose hanging from the free end of the hose boom arm and the weight of the hose boom arm itself on a "swivel cartridge" component of the ZIERCO system causes uneven forces on the internal bearings of the swivel cartridge. As a result, the average life of such a cartridge is approximately six months. The cost of replacing a swivel cartridge is typically $65.00 to $75.00.

Despite widespread recognition of the above problems in the car wash industry for at least the last fifteen years, and despite the high cost of continually replacing damaged hoses, swivel cartridges, and paying claims made by persons who have been injured or had their property damaged, no one has been able to provide a satisfactory solution to the above described problems. Therefore, it is obvious that there is an unmet need for an economical, practical system for causing hose boom swivel mechanisms of the type described above to automatically return to positions such that the feed hoses do not droop in the paths of automobiles entering car wash bays while also having the characteristics that the automatic return mechanism does not substantially interfere with convenient use of the spray wand as the user washes all sides of his vehicle and does not cause the feed hose to drape over the surface of the vehicle.

Accordingly, it is an object of the invention to provide a self-return method and mechanism for causing a swivel hose boom assembly to automatically return to a predetermined position without interfering with swivel operation thereof through a major portion of a 360° arc through which the mechanism must swivel.

It is another object of the invention to provide a means and method for reducing wear on bearings of the swivel cartridge contained in the above-described prior art hose boom swivel assembly.

It is another object of the invention to provide a selfservice car wash which avoids injury to people and property caused by drooping of a feed hose in the path of a vehicle entering the self service car wash establishment.

It is another object of the invention to provide an apparatus and method for retrofitting pre-existing swivel hose boom assemblies to cause them to self-return to positions which avoid drooping of feed hoses in the paths of cars entering a self-service car wash bay but allow free swiveling of such hose boom assemblies throughout most of the circular arc through which they must swivel during use by customers.

Many customers have asked me to provide a solution to this problem, and I and one of my employees have spent considerable effort and thought trying to provide a solution to the problem, but it was not until I independently conceived of the invention described herein that there appeared to be any adequate and economical solution to the problem. No self-returning mechanical devices of any kind that I know of including any which have ever been applied to any car wash apparatus) provides a self-returning function that does not interfere with free pivoting of a pivot mechanism through a substantial portion of its pivot range.

SUMMARY OF THE INVENTION

Briefly described, and in accordance with one embodiment thereof, the invention provides a method and apparatus for causing a swivel assembly to self-return to a predetermined direction if the direction of the swivel assembly is within a substantial predetermined arc and allows free swiveling of the swivel assembly throughout the remaining arc through which the swivel assembly is capable of pivoting. In the described embodiment of the invention, the swivel assembly is incorporated in a hose boom swivel assembly attached to the ceiling of an open ended self-service car wash bay. A high pressure line feeds the hose boom swivel assembly, causing highly pressurized liquid and/or detergent to flow through a swivel cartridge into a feed hose that extends through a pivotal hose boom. The feed hose droops from the free end of a hose boom arm and leads to a spray wand that is manipulated by user to direct a high pressure spray at a vehicle being washed. The spray wand is placed in a wand holder attached to a sidewall of the bay when not in use. The wand holder is located sufficiently close to a coin box mounted on the sidewall near an open end of the bay to enable a user to grip the handle of the spray wand before actuating the system by inserting a coin in the coin box mechanism. The self-return mechanism includes a semicircular cam disc having a substantially straight chord-like camming surface. A base plate is retrofitted to engage a hinge plate of the swivel assembly. A cam follower including a roller rotatably mounted on a slide plate is forced against the edge of the cam disc by a spring assembly that applies opposed forces to the base plate and the cam follower slide plate. The chord-like camming surface subtends an arc of approximtely 90°, the remainder of the camming surface being substantially circular. The semicircular cam disc is mounted in a stationary configuration relative to the pivotal hose boom with the cam follower attached thereto, so that the cam follower roller can roll through a 270° arc on the circular edge surface of the cam disc without producing a preferential pivoting force on the hose boom. However, within the 90° arc through which the cam roller rides on the chord-like cam surface, the spring force urging the cam follower against the chord-like cam surface causes the hose boom to move preferentially toward a direction which centers the cam roller in the middle of the chord-like cam surface. The position of the semicircular cam disc is selected so that the end of the hose boom holds the upper end of the feed hose near a sidewall of the car wash bay, so that the feed hose does not droop in the path of a vehicle entering the car wash bay.

BRIEF DESCRIPTION OF THE DRAWINGS

FIG. 1 is a perspective view showing the interior of a self-service car wash bay in which the self-return mechanism of the present invention is installed.

FIG. 2 is a perspective view of the self-return mechanism of the present invention installed on the hose boom swivel assembly shown in FIG. 1.

FIG. 4 is a partial top view of the self-return attachment shown in FIG. 2 and is useful in explaining the operation thereof.

DESCRIPTION OF THE INVENTION

Figure 3:
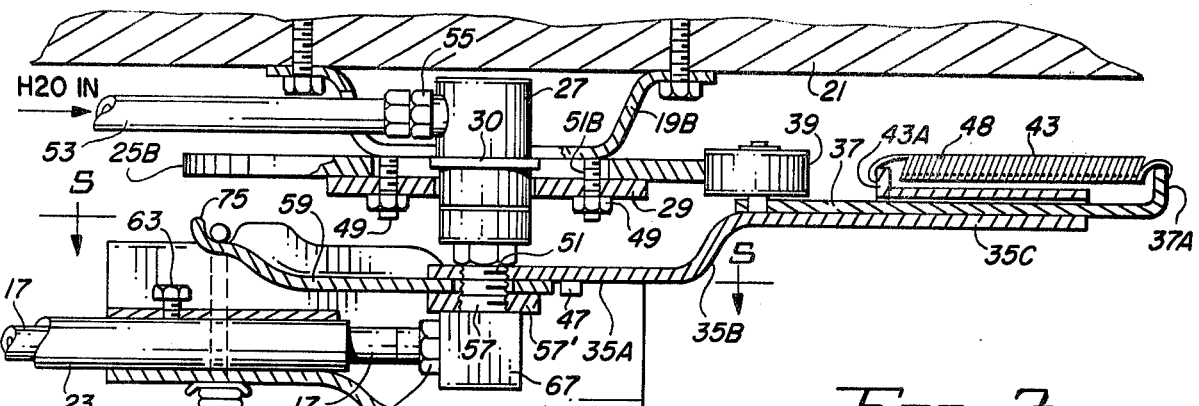
FIG. 3 is a section view taken along section line 3—3 of FIG. 2.

Referring now to the drawings, particularly FIG. 1, self-service car wash bay 1 includes a open ended region sheltered by a high ceiling 7 and two side walls 8 and 9. Entry 3 and exit 5 are open. A coin receiving mechanism 11, with coin receiving slot 11A therein, is mounted on side wall 9 a few feet from the edge of entry 3 at a suitable height and far enough away from a vehicle being washed to avoid being subjected to excessive spraying as a vehicle is being washed in bay 1. A wand holder 15 is rigidly attached to wall 9 in such a position that the user can securely grip a spray wnd 13 in wand holder 15 before he inserts coins in slot 11A to activate the car wash device.

Figure 6:
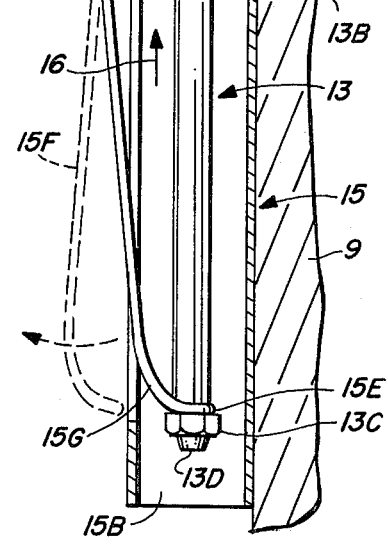
FIG. 6 is a section view of the spray wand and wand holder shown in FIG. 1.

Spray wand 13, which is shown in more detail in FIG. 6, includes a handle 13A, which is fed with highly pressurized liquid conducted by high pressure flexible hose 17. Spray wand 13 also has a barrel 13B and an ejection nozzle 13D. Wand holder 15 includes a tube that is open at its upper end 15A and also is open at its lower end 15B. A locking arm 15C that pivots on a pivot element 15D has a curved lower end section 15G that engages a shoulder 13C attached to spray wand barrel 13B, thereby preventing spray wand 13 from being withdrawn from wand holder 15 unless the locking arm 15C is pivoted into the configuration shown by dotted line 15F, so that the lower end 15G of lever 15C is disengaged from shoulder 13C.

The provision of locking arm 15C is desirable (although not essential) to prevent spray wand 13 from being "jet propelled" out of wand holder 15 by the ejection of the high velocity jet of spray in the event that someone inserts a coin in slot 11A (thereby activating the high pressure liquid pump of the system) without first securely gripping spray wand handle 13A.

Returning now to FIG. 1, high pressure flexible hose 17 droops as indicated by reference numeral 17" from handle 13A and then extends up to a boom spring 23A that is attached to the end of a rigid tubular boom arm 23. Boom arm 23 is rigidly attached to a swivel assembly that is generally designated by reference numeral 19 in FIG. 1. Swivel assembly 19 is rigidly attached to the ceiling 7 by means of a mounting plate 21. Swivel assembly 19 is preferably the previously described ZIERCO WATER BOY hose boom swivel assembly. Except for the action of a self-return mechanism generally designated by reference numeral 25 in FIG. 1, swivel assembly 19 can swivel relatively freely through an entire circular arc of 360°, as indicated by reference numeral 14 in FIG. 1.

If boom arm 23 is aimed within a predetermined arc of approximately 90°, the self-return mechanism 25 causes hose boom swivel assembly 19 and boom arm 23 to automatically aim or return boom arm 23 in a direction that is roughly perpendicular to side wall 9, so that the extreme end of boom arm 23 is close to the upper center surface portion of side wall 9. Therefore, hose 17 droops downward and then up to handle 13A of spray wand 13 in such a way that it is roughly parallel to the surface of side wall 9. This avoids the previously described problem wherein the force produced by the drooping feed hose causes boom arm 23 to pivot so that it points diagonally across ceiling 7 toward wand holder 15, causing feed hose 17 to droop in the path of cars entering car wash bay 1.

Perhaps it will be most helpful to understanding of the structure and operation of self-return apparatus 25 if the detailed structure of hose boom swivel assembly 19 above is first set forth with reference to the drawings, especially FIGS. 2, 3, 3A and 5. These drawings also show portions of the self-return apparatus. However, initially only the hose boom swivel assembly portion of the illustrated apparatus will be described; later the portions of the drawings illustrating the self-return apparatus of the present invention will be described.

The hose boom swivel assembly 19 includes boom body 19A, springs 45, swivel cartridge 27, cartridge collar 29, and swivel base 19B, as shown in FIG. 2. The other elements shown in FIG. 2 constitute the self-return mechanism of the present invention, and are described subsequently.

Referring now to FIG. 3, a high pressure liquid feed line 53 is connected to a high pressure pump and detergent mixing mechanism that is actuated when the proper amount of money is dropped through coin slot 11A. A suitable threaded fitting 55 screws into a threaded opening in the upper end of swivel cartridge 27. Swivel cartridge 27 is securely mounted in stationary swivel base 19B. Swivel base 19B has an annular outer flange which is bolted to mounting plate 21, which in turn is rigidly attached to ceiling 7.

Cam disc 25B, which is part of the present invention, is not present in the basic prior art hose boom swivel assembly 19. Cartridge collar 29 engages a shoulder 30 of swivel cartridge 27 to accomplish the secured attachment of swivel cartridge 27 to swivel base 19B.

Swivel cartridge 27 has a rotatable, hollow, fluid conducting tubular threaded stud 57 extending from its lower end. Ordinarily, threaded stud 57 is threaded through and extends out of the lower end of a threaded hole in a nut block 57'. A right angle plumbing coupler 67 is threaded onto the lower end of stud 57, which extends through and protrudes from the bottom of nut block 57'. A threaded coupler 65 is tightly threaded into another threaded opening in right angle plumbing coupler 67. Coupler 65 is attached to the upper end of flexible hose 17, previously described. The end of flexible hose 17 then passes from coupler 65 and into tubular boom arm 23. Boom arm 23 is rigidly attached by means of a set screw 63 to boom body element 19A.

Boom body 19A can pivot vertically relative to hinge plate 59. Hinge plate 59 is rigidly attached by welding to previously mentioned nut block 57'. However, boom body 19A cannot rotate horizontally relative to hinge plate 59.

Figure 3A:
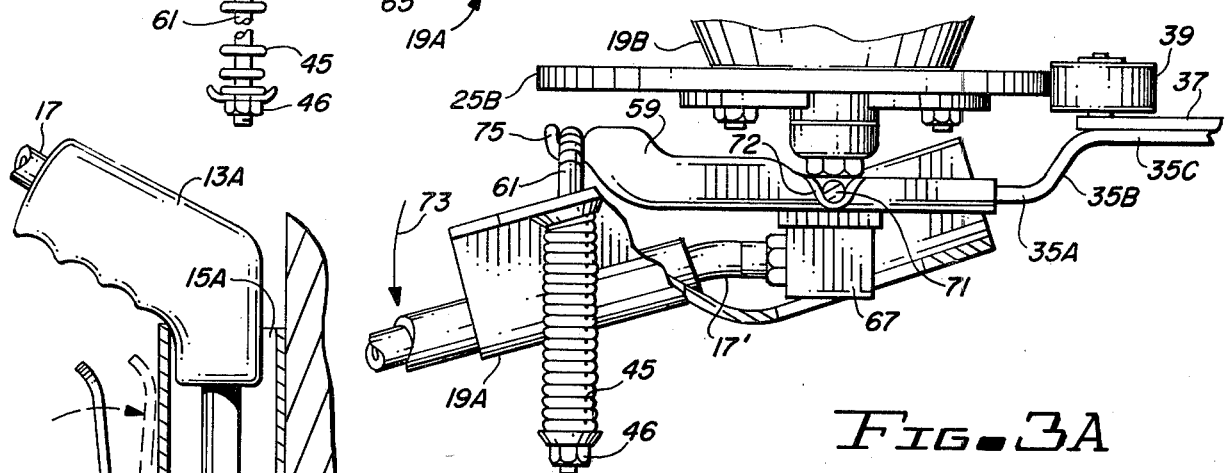
FIG. 3A is a partial cutaway side view useful in explaining the operation of the hose boom swivel assembly shown in FIG. 2.
Figure 5:
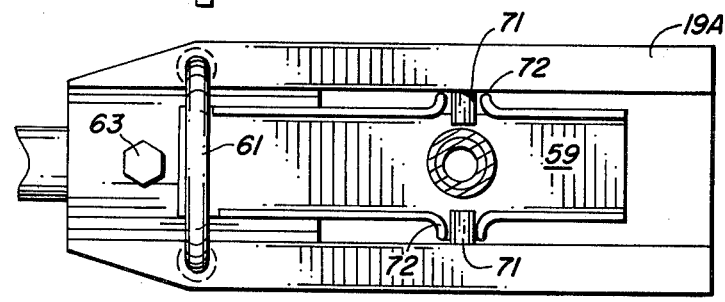
FIG. 5 is a top view of the boom body and swivel plate of the hose boom swivel mechanism shown in FIG. 2.

It should be appreciated that hollow stud 57 extends from an internal bearing in swivel cartridge 27, so that hollow stud 57 can rotate relative to the outer housing of swivel cartridge 27, which is rigidly, non-movably clamped to swivel base 19B. As best seen in FIGS. 3A and 3B, if enough downward tension is applied to flexible hose 17, the free end of boom arm 23 can be pulled downward, causing springs 45 to compress. The lower ends of springs 45 are retained by nuts 46 which are threaded onto a large U bolt 61. U bolt 61 is retained by a lip 75 of hinge plate 59. Feed hose 17 flexes, as indicated by reference numeral 17' in FIG. 3A, since right angle coupler 67 is pivotal only about a vertical axis, but not about a horizontal axis.

Boom body 19A has two pivot pins 71 (see FIGS. 3A and 5) rigidly attached thereto. Pivot pins 71 are journaled in the illustrated recesses 72 of hinge plate 59.

As previously mentioned, the above hose boom swivel assembly is very commonly used in the self-service car wash art, and is considered by many to be the best overall car wash hose boom swivel assembly available, despite the previously mentioned difficulties associated with drooping hose 17.

In order to make boom arm 23 self-return to the position shown in FIG. 1 when wand 13 is placed in wand holder 15 after use, self-return mechanism 25 (FIG. 1) is retrofitted onto hose boom swivel assembly 19. How this is done will be better understood after the self-return assembly 25 is described in detail. Self-return assembly 25 includes two sections, namely a cam follower section 25A (FIG. 2) and a cam disc 25B, also shown in FIG. 2. Cam disc 25B is perfectly circular, except for a chord-like camming surface 33 which subtends a 90° arc in the presently preferred embodiment of the invention. Reference numeral 31 represents the circular peripheral surface portion of cam disc 25B. The center of cam disc 25B has been removed to produce a circular hole 51. The diameter of circular hole 51 is large enough that bolts 49 through cartridge collar 29 also pass through hole 51. As subsequently explained, this allows the direction of camming surface 33 to be easily adjusted in order to make boom arm 23 return to the desired direction.

Cam follower assembly 25A includes a stationary (i.e., stationary relative to hollow threaded stud 57) plate member 35 and a movable member 37 that is spring loaded relative to stationary member 35 to urge it in the direction indicated by arrow 34. A roller 39 is freely rotatably mounted on movable member 37 by means of a pin 41 and suitable bearings. A guide plate 43 is rigidly attached to elevated portion 35C of stationary member 35 and includes two way members 43B and 43C and a connecting cross member 43A that is elevated relative to the upper surface of portion 35C of stationary member 35, so that movable member 37 can slide freely in the direction indicated by arrow 34' in FIG. 4. Springs 48, both of which operate in tension, engage an end tab 37A of movable plate 37, and extend between bar 43A, thereby producing a constant force tending to urge movable plate 37 and cam follower roller 39 toward cam disc 25B. Way members 43B and cross member 43A form a close fitting slot through which movable plate 37 extends.

As best seen in FIG. 3, cam disc 25B is clamped to swivel base 19 by cartridge clamp 29. A suitable washer (not shown) is provided between cartridge clamp 29 and shoulder 30 to compensate for any difference in thickness between cam disc 25B and shoulder 30 of swivel cartridge 27. Bolts 49 are tightened after cam disc 25B has been rotated so that flat camming surface 33 is aimed in a direction that is opposite to and perpendicular to the direction to which it is desired to have boom arm 23 return.

Stationary member 35A of cam follower assembly 25A has a sloped portion 35B between lower portion 35A and upper portion 35C so that roller 39 will be at the same elevation as the periphery of cam disc 25B.

Upon a moment's reflection, it can be seen that if boom arm 23 (FIG. 2) is swung horizontally in the direction indicated by arrow 54, roller 39 will roll in the direction indicated by arrow 59 as cam follower assembly 25A moves generally in the direction of arrows 56 and 56'. The force produced on movable plate 37 and roller 39 by springs 45 in the direction of arrow 34 will obviously continue to urge swivel assembly 19 and cam follower assembly 25A to continue moving until the center (i.e., the lowest potential energy point), designated by reference numeral 60, of camming surface 33 is reached. (Those skilled in the art will realize that springs 48 store potential energy when they are stretched within their elastic limits, and the mechanical system including springs 48, movable member 37, roller 39, and chord-like camming surface 33 will naturally try to relax to a minimum potential energy configuration). As boom arm 23 continues to rotate in the direction of arrow 54, and as roller 39 continues to roll toward point 62, the point at which flat cam surface 33 meets circular cam disc surface 31, roller 39 moves in the direction opposite to the direction of arrow 34, stretching strings 45 as plate 37 is forced to the right. Once roller 39 reaches circular surface 31, movable plate 37 does not move relative to stationary member 35, and springs 45 neither stretch nor relax as roller 39 continues to roll. Therefore, it can be seen that hose boom swivel assembly 19 can continue to rotate freely (except for friction) in the direction indicated by arrow 54 (FIG. 2) from point 62 through an angle of 270° until the opposite end of flat camming surface 33 is reached, when movable plate 37 will start again moving in the direction of arrow 34 as springs 45 relax, urging boom arm 23 toward the point at which roller 39 is centered at minimum energy point 60 on camming surface 33. And, of course, if the direction of rotation of hose boom swivel assembly 19 is opposite to the direction of arrow 54, so that roller 39 rolls off of circular surface 31 onto the left end of camming surface 33, the force produced by springs 45 will cause roller 39 to self-return to the same point, namely, minimum energy point 60, and in either case, boom arm 23 is returned to the direction shown in FIG. 1 so that hose 17 droops out of the path of a vehicle.

It should be noted that in addition to self-returning to a point that moves drooping feed hose 17 out of the path of a vehicle entering bay 1, the self-returning apparatus 25 provides another advantage by offsetting stress on internal bearings of swivel cartridge 27 caused by the weight of hose 17 and boom arm 23. It can be seen that the counterforce produced on stationary member 35 by springs 48 produces a clockwise moment on stationary member 35, and hence on threaded stud 57 and the internal bearing surfaces of swivel cartridge 27, in a direction opposite to the counterclockwise moment produced thereon by the downward force produced on boom arm 23 by its own weight and the weight of feed hose 17. The resulting reduction in stress on the internal bearings of swivel cartridge 27 substantially increases its useful life.

A great advantage of the above-described self-returning device 25 is that it can be easily installed on pre-existing hose boom swivel assemblies 19 by simply removing the coupling element 67, unthreading hinge plate 59 from stud 57, removing cartridge clamp 29, positioning cam disc 25B (with camming surface 33 thereof in the direction opposite to the point at which it is desired to have boom arm 23 self-return), and tightening bolts 49 to cause cartridge clamp 29 to rigidly clamp both cam disc 25B and swivel cartridge 27 securely to stationary swivel base 19B. Then stationary member 35A is positioned so that threaded stud 57 extends through clearance hole 51 and hinge plate 59 and nut block 57' thereof are threaded back onto threaded stud 57. Bar 47 on the bottom of member 35A abuts the right end of hinge plate 49, preventing member 35A from rotating relative to hinge plate 59. The entire retrofitting operation requires no cutting, drilling or other difficult operations. The simple expedient of adding the self-return mechanism 25 to hose boom swivel assembly 25 (which is implemented by the above mentioned ZIERCO WATER BOY device) completely solves the previously described problems without making the spray wand and feed hose significantly more difficult to manipulate by the user because the swivelability of hose boom swivel assembly 19 is substantially uneffected for at least 270° of its swivel range.

While the invention has been described with reference to a particular embodiment thereof, those skilled in the art will be able to make various modifications to the described embodiment without departing from the true spirit and scope of the invention. For example, it is not necessary that camming surface 33 be flat; in fact, it could be somewhat curved, as indicated by dotted line 33' in FIG. 4. Without departing from the basic principle of the disclosed device, modifications could be easily made that allow the device to be used in conjunction with different models of swivel assemblies.

I claim:

1. A self-returning hose boom swivel apparatus for a car wash bay, said apparatus comprising in combination:
   (a) a spray wand holdable by a user for directing a high pressure liquid spray at a vehicle being washed in said bay;
   (b) wand holding means attached to a side wall of said bay for securely holding said spray wand when it is not in use;
   (c) a flexible feed hose connected to said spray wand for supplying highly pressurized liquid to said spray wand;
   (d) a hose boom swivel assembly attached to a generally central portion of a ceiling of said bay for supporting an elevation portion of said feed hose at any point along a circular locus of points around said generally central portion of the ceiling so that when a user carries said spray wand entirely around said vehicle in the course of washing all sides of said vehicle, said elevated portion of said feed hose freely travels along said circular locus of points in order to prevent said feed hose from being draped across said vehicle, said hose boom swivel assembly having a stationary part and a swivelable part, said swivelable part having a swivel range about a vertical axis;
   (e) self-returning means for automatically causing said swivelable part to return to a predetermined position from any position within a first portion of said swivel range and allowing said swivelable part to swivel non-preferentially in either direction about said vertical axis from any position within the remainder of said swivel range, said predetermined position being a position that holds said elevated portion of said feed hose adjacent to said side wall and holds a drooping portion of said feed hose out of the path of said vehicle as said vehicle enters said bay if said spray wand is in said wand holding means;
   said self-returning means including
      (i) camming means for supporting a camming surface having a first portion corresponding to said first portion of said swivel range and having a continuum of successive locations having associated therewith successively reduced potential energies, one of said locations being a minimum potential energy location, said camming surface having a second portion corresponding to said remainder of said swivel range and also having a substantially constant potential energy associated therewith;
      (ii) cam following means for engaging said camming surface and preferentially following said first portion of said camming surface to said minimum potential energy location thereof;
      (iii) first means connected to said camming means for holding said camming surface in fixed relation to one of said stationary part and said swivelable part;
      (iv) second means connected to said cam following means for holding a portion of said cam follower means in fixed relation to the other of said stationary part and said swivelable part;
   said cam following means and said camming means cooperating to return said swivelable part to said predetermined position from any position in said first portion of said swivel range as said cam following means seeks said minimum potential energy location of said camming surface.

2. The self-returning hose boom swivel apparatus of claim 1 wherein said swivelable part includes a tubular boom arm through which said feed hose extends, said boom arm having an outer end from which said feed hose extends and droops toward said spray wand, the outer end of said boom arm traveling along said circular locus of points at said swivelable part swivels about said vertical axis.

3. The self-returning hose boom swivel apparatus of claim 2 wherein said spray wand is attached to said side wall adjacent to and sufficiently close to a coin receiving mechanism that causes activation of a high pressure source for liquid supplied to said feed hose, so that the user can hold the handle of said spray wand while inserting a coin in said coin receiving mechanism, said coin receiving mechanism being positioned adjacent to an open end of said bay and out of the range of overspray produced by said spray wand during washing of said vehicle.

4. The self-returning hose boom swivel apparatus of claim 3 wherein said camming means includes a semicircular disc, the edge of which supports said camming surface, said first portion of said camming surface including a chord-like edge surface portion of said semicircular disc.

5. The self-returning hose boom swivel apparatus of claim 4 wherein said chord-like edge surface portion is substantially flat.

6. The self-returning hose boom swivel apparatus of claim 4 wherein said chord-like edge surface portion is generally V-shaped.

7. The self-returning hose boom swivel apparatus of claim 4 wherein said chord-like edge surface portion subtends an arc of approximately ninety degrees of a circle that coincides with the circular portion of said semicircular disc.

8. The self-returning hose boom apparatus of claim 4 wherein said stationary part includes a swivel hose and said semicircular disc is clamped to said swivel base by a clamping collar, said clamping collar being included in said first means.

9. The self-returning hose boom apparatus of claim 8 wherein said semicircular disc is annular to allow bolts to pass from said clamping collar through a central hole in said semicircular disc to allow the direction of said chord-like edge surface portion of said semicircular disc to be adjusted before tightening of said bolts.

10. The self-returning hose boom apparatus of claim 8 wherein said hose boom swivel assembly includes a swivel cartridge having a swivelable part that swivels about said vertical axis, and said cam following means includes
   (i) a first member rigidly connected to said swivelable part of said swivel cartridge,
   (ii) a movable member that is movable with respect to said first member,
   (iii) a cam follower roller rotatably attached to said movable member, and
   (iv) forcing means for exerting a force on said movable member to urge said cam follower roller against said camming surface.

11. The self-returning hose boom apparatus of claim 10 wherein:
   (a) said forcing means includes a spring connected to said movable member and also connected to said first member to produce said force;
   (b) said second means includes a portion of said first member having a hole therein through which said swivelable part of said swivel cartridge extends, said portion of said first member being clamped in fixed relation to said swivelable part of said swivel cartridge by a hinge plate, said hinge plate being included in said swivelable part of said hose boom swivel assembly, and
   (c) guide means attached in fixed relation to said first member for guiding movement of said movable member.

12. The self-returning hose boom apparatus of claim 5 wherein said feed hose has a length and weight that causes said swivelable part to be pulled toward said wand holding means so that said swivelable part rotates to a position wherein said cam following means engages said chord-like portion of said camming surface if said wand is placed in said wand holding means, whereby said cam following means preferentially moves toward said minimum potential energy location to cause said boom arm to swing to a position wherein said feed hose is entirely out of the path of said vehicle.

13. A method of returning a hose boom swivel apparatus in a car wash bay to a predetermined configuration, said hose boom swivel apparatus including a hose boom swivel assembly attached to a generally central portion of a ceiling of said bay for supporting an elevated portion of a flexible feed hose at any point along a circular locus of points around said generally central portion of the ceiling so that when a user carrying a spray wand attached to a free end of said feed hose carries said wand entirely around a vehicle being washed in said bay in the course of washing all sides of said vehicle, said elevated portion of said feed hose freely travels along said circular locus of points in order to prevent said feed hose from being draped across said vehicle, said hose boom swivel assembly having a stationary part and a swivelable part, said swivelable part having a swivel range about a vertical axis, said method comprising the steps of:
   (a) positioning said spray wand securely in a wand holder that is rigidly attached to a side wall of said bay;
   (b) applying a first force to a free end of said hose boom swivel assembly by means of the weight of said feed hose, said feed hose drooping from said elevated portion thereof, said wand holder being located near an open end of said bay, said first force causing said swivelable part of said hose boom swivel assembly to swivel enough to bring said swivelable part into a first predetermined portion of said swivel range;
   (c) applying a second force by means of a cam follower element to a chord-like camming surface of a semicircular cam disc while said swivelable part is within said first predetermined portion of said swivel range, said vertical axis passing approximately through the center of said semicircular cam disc and being approximately perpendicular to the plane of said semicircular cam disc, said cam follower element also applying force to a circular edge surface of said semicircular cam disc while said swivelable part is in a second predetermined portion of said swivel range which is exclusive of said first predetermined portion of said swivel range, said second force resulting in an equal and opposite counterforce being applied by said cam follower element to a cam follower assembly, said chord-like camming surface having a point with a minimum potential energy associated therewith; and
   (d) applying said second force and said counterforce in opposite directions between said stationary part and said swivelable part to cause rotation of said swivelable part relative to said stationary part until said cam follower finds said minimum potential energy point of said chord-like camming surface.

14. The method of claim 13 including adjusting the orientation of said semicircular cam disc relative to said cam follower assembly so that said elevated portion of said feed hose is sufficiently close to said side wall of said bay that the drooping portion of said feed hose is out of the path of said vehicle when said cam follower element engages said minimum potential energy point of said chord-like camming surface.

* * * * *